(No Model.)
F. H. WENHAM.
GAS LAMP.
No. 353,650. Patented Nov. 30, 1886.
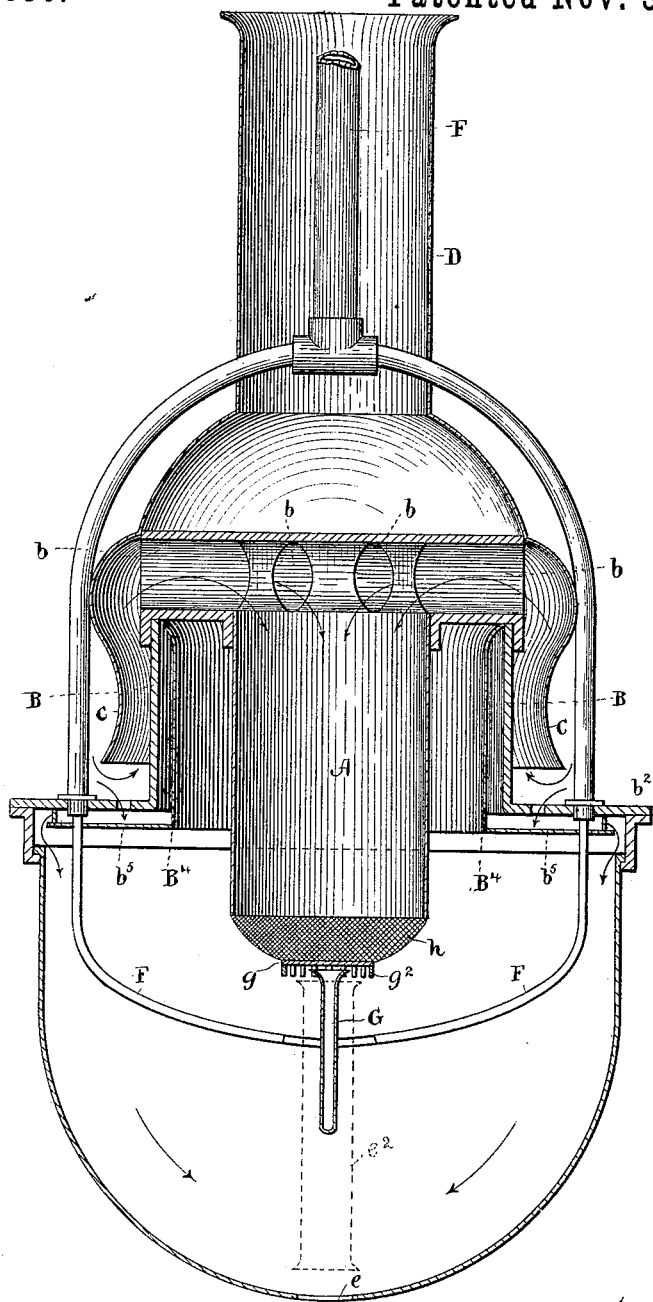

UNITED STATES PATENT OFFICE.

FRANCIS HERBERT WENHAM, OF THE BEACON, GOLDSWORTH, WOKING, COUNTY OF SURREY, ENGLAND.

GAS-LAMP.

SPECIFICATION forming part of Letters Patent No. 353,650, dated November 30, 1886.

Application filed October 11, 1886. Serial No. 215,879. (No model.) Patented in England February 2, 1885, No. 1,514, and August 11, 1886, No. 10,279; in Victoria May 4, 1885, No. 4,049; in New South Wales July 13, 1885, No. 6,757; in Russia October 28, 1885; in South Australia December 7, 1885, No. 629; in Queensland April 20, 1886, No. 72; in Spain June 10, 1886, No. 5,554, and in Denmark June 18, 1886.

*To all whom it may concern:*

Be it known that I, FRANCIS HERBERT WENHAM, engineer, a subject of the Queen of Great Britain and Ireland, and residing at The Beacon, Goldsworth, Woking, in the county of Surrey, England, have invented certain new and useful Improvements in Gas-Lamps, (for which I have obtained patents in Great Britain, dated February 2, 1885, No. 1,514; Victoria, dated May 4, 1885, No. 4,049; New South Wales, dated July 13, 1885, No. 6,757; South Australia, dated December 7, 1885, No. 629; Queensland, dated April 20, 1886, No. 72, and Spain, dated June 10, 1886, No. 5,554, and have made applications for patents in Russia on October 28, 1885; in Denmark on June 18, 1886, and in Great Britain on August 11, 1886, No. 10,279,) of which the following is a specification.

My invention relates to the class of gas-lamps wherein the air supplied to the lamp is heated in its passage to the flame by means of an air-heating chamber placed above the burner, the flame being inclosed in a glass, and the air-inlets and the chimney being so arranged that a cup or saucer shaped flame is obtained.

The objects of my present invention are principally to provide efficient lamps of simple construction, and wherein the orifices for the escape of the gas are not liable to become clogged by carbonaceous matter.

The accompanying drawing shows in vertical section a lamp constructed in accordance with my invention.

A is an inner chamber situated in the center of the lamp-casing B, the tubes $b$ leading air from outside the lamp to the chamber A. The lower end of the inner chamber, A, into which the air for supplying the inside of the flame is received, is covered with a perforated plate or gauze, $h$, either flat or (preferably) of a cup or dished form, as shown, and at the center of this is placed a disk, $g$, for receiving the impact of gas from a jet, G, beneath it, the said jet having preferably a widened, flanged, or trumpet-shaped orifice. The gas-supply is conveyed from above through pipes F F, passing outside the lamp-casing clear of the air-heating chamber, or through one such pipe, the upper part of which may be situated inside or outside the chimney.

The circumference of the disk $g$ is shown as having a downward rim with notches, as at $g^2$, in it; or it may have the equivalent thereof—such as pegs, wires, bars, or orifices. When the gas is lighted, the flame spreads outward under the perforated plate or gauze $h$, the gas in its passage being divided into streams by passing through or between the notches or the like around the disk $g$ in such a manner that the heated air from the chamber A permeates the flame, and when the glass E is closed below it the draft through the heating-chamber A brings a current of heated air from above, as indicated by the arrows, so as to depress the flame, the air entering the lamp by passing in beneath the curtain C, and then through the horizontal tubes $b$ into the chamber A, and thence through the gauze $h$, or its equivalent, to the flame. The curtain C protects the lamp from direct air-currents. Air is admitted through orifices $b^3$ in the cover $b^2$ of the lamp, as shown by the arrows, or at other suitable parts, (as, for example, through an opening, $e$, or perforations at the bottom of the lamp-glass E,) in sufficient quantity to complete combustion by the admission of air below the flame. There is shown an inner cylinder, $B^4$, with a flange, $b^5$, between which flange and the cover $b^2$ the air for the outer side of the flame passes; but this cylinder and flange may be dispensed with. When a perforation, $e$, is used in the lower part of the glass E, a tube, as shown in dotted lines at $e^2$, may be used, and the perforation $e$ being situated directly beneath this tube, it acts on the injector principle, and a current of air through the tube is obtained.

It will be evident that the pegs $g^2$ or serrated rim, or the equivalent thereof, surrounding the gas-outlet from the burner, may be situated around a flange at the mouth of the burner, which may be covered with a loose cap answering the purpose of the disk $g$. This is best suited for use where the gas-supply is required to be taken from below through an ascending pipe—as, for example, in street-lamps with framed lanterns. The invention is shown as applied to a suspension-lamp; but it may be applied to a pillar or street or other lamp, (or to other existing fittings,) and when supported from below the gas-pipe F will pass directly upward through the bottom of the lamp-glass.

The gauze or its equivalent may be situated in any suitable position in or in connection with the air-chamber, and in place of gauze I may use perforated or divided plates or rings of metal or equivalent means of breaking up the air and dividing it into small streams for properly distributing it.

It will be seen that in this lamp, by the simple arrangements of parts, as shown, a regulated supply of heated air is obtained, and that a cup or saucer shaped flame is produced without the use of a reflecting flame-plate above the flame or a disk or button beneath it; and, further, that as the gas is not highly heated before it escapes at the burner, the gas-outlet orifices are not liable to be clogged by carbonaceous particles depositing in them.

I claim—

1. In a gas-lamp, the combination of a lamp-casing and flame-inclosing glass, an air-heating chamber provided with an air-dividing gauze, a burner supported directly below the air-chamber, and a gas-supply pipe entering the lamp from above, but clear of the air-heating chamber, substantially as described.

2. In a gas-lamp, the combination, with the lamp-casing, of an air-heating chamber provided with an air-dividing gauze, a burner below said chamber, a disk or cover, and a notched or pegged rim or flange surrounding said burner, substantially as described.

In testimony whereof I have signed my name to this specification in the presence of two subscribing witnesses.

FRANCIS HERBERT WENHAM.

Witnesses:
HENRY G. FREEMAN,
C. N. NEWTON,
  Both of 9 Birchin Lane, E. C.